(12) United States Patent
Shamarao

(10) Patent No.: US 7,134,034 B1
(45) Date of Patent: Nov. 7, 2006

(54) DATA PATHS WITH RECEIVER TIMING FIXABLE TO A DOWNSTREAM STAGE AND METHODS OF OPERATION THEREOF

(75) Inventor: Prashant Shamarao, Alpharetta, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 420 days.

(21) Appl. No.: 10/686,420

(22) Filed: Oct. 15, 2003

(51) Int. Cl.
*G06F 1/12* (2006.01)
*G06F 13/42* (2006.01)
*H04L 5/00* (2006.01)
*H04L 7/00* (2006.01)

(52) U.S. Cl. .................. 713/401; 365/189.05; 365/194

(58) Field of Classification Search ................ 711/161; 365/191–197, 233, 233.5, 189.05; 713/400–601
See application file for complete search history.

(56) References Cited

U.S. PATENT DOCUMENTS 5,068,831 A * 11/1991 Hoshi et al. ................ 365/203
6,011,732 A * 1/2000 Harrison et al. ............ 365/194
6,061,297 A * 5/2000 Suzuki ..................... 365/238.5
6,192,003 B1 * 2/2001 Ohta et al. .................. 365/233
6,226,222 B1 * 5/2001 Park ............................ 365/233
6,288,953 B1 * 9/2001 Kwak ......................... 365/196
6,757,212 B1 * 6/2004 Hamamoto et al. ......... 365/233

* cited by examiner

Primary Examiner—Lynne H. Browne
Assistant Examiner—James F. Sugent
(74) Attorney, Agent, or Firm—Myers Bigel Sibley & Sajovec PA

(57) ABSTRACT

A data path includes a downstream stage that strobes data at an input thereof responsive to a first control signal, an upstream stage that sends data to the input of the downstream stage responsive to a second control signal, and a control circuit operative to fix timing of the second control signal to timing of the first control signal. The data path may further include a second upstream stage that sends data to an input of the first upstream stage responsive to a third control signal having a timing with respect to the second control signal that varies responsive to a frequency at which data is transferred along the data path. A fixed delay circuit, e.g., a fixed delay circuit in a forward path of a DLL or PLL, may generate the first control signal from the second control signal.

29 Claims, 8 Drawing Sheets

DATA PATHS WITH RECEIVER TIMING FIXABLE TO A DOWNSTREAM STAGE AND METHODS OF OPERATION THEREOF

BACKGROUND OF THE INVENTION

The present invention relates to data transmission techniques, and more particularly, to data path timing in circuitry, such as integrated circuit memory devices.

Integrated circuit devices, such as high-speed memory devices, typically include data paths that include circuits, such as sense amplifiers, that strobe input data subject to an intermittently asserted signal (e.g., an enable or clock signal). Generally, valid data input must be present at the input of such a circuit within certain timing constraints relative to the strobe signal.

An exemplary data path as might be found in an integrated circuit is illustrated in FIG. 1, and exemplary operations of the data path of FIG. 1 are illustrated in FIG. 2. At a certain point during a data access cycle, a data driver enable signal DEN is activated to cause a data driver 10 to output data. This output data passes on to an output flip-flop (FF) 40 through circuitry 20, e.g., wiring, buffers, etc., that introduces delay between when the data is produced at the output of the data driver 10 and when it appears at the input of the FF 40. If the data is not in a form that the FF 40 can handle (e.g., has insufficient swing differential), a receiver 30 (e.g., a sense amplifier) may be used to convert the data format to meet the input requirements of the FF 40. The timing of a receiver enable signal REN applied to the data receiver 30 typically needs to be such that correct data is present at the input of the data receiver 30 a certain time before the receiver enable signal REN is asserted. The receiver 30 typically needs a certain amount of time to convert the data format, after which the output FF 40 can be clocked responsive to an output clock signal OCLK.

In the conventional circuit of FIG. 1, time $t_{en}$ between assertion of the driver enable signal DEN and the assertion of the receiver enable signal REN is typically fixed based on a starting point in a data access cycle. The minimum cycle time of the data path is generally constrained by the timing requirements of the FF 40, as time interval t' between the receiver enable signal REN and the output clock signal OCLK generally varies as the cycle time of the data path varies.

In designing such a data path in an integrated circuit device, such as a high-speed memory device, delay attributable to data propagation and manipulation between the data driver 10 and the data receiver 30 is typically estimated using simulations. These simulations are often used to determine a minimum time ten between assertion of the driver enable signal DEN and assertion of the receiver enable signal REN that guarantees, for a given operating envelope, that valid data will be present at the input of the data receiver 30 before the receiver enable signal REN is asserted. In particular, circuit and device models are typically used to estimate data delay in the presence of process, temperature and power supply voltage variations. Such an approach can lead to an overly conservative design for a particular device.

SUMMARY OF THE INVENTION

In some embodiments of the present invention, a data path includes a downstream stage that strobes data at art input thereof responsive to a first control signal, an upstream stage that sends data to the input of the downstream stage responsive to a second control signal, and a control circuit operative to fix timing of the second control signal to timing of the first control signal. For example, the upstream stage may include a first upstream stage, and the data path may further include a second upstream stage that sends data to an input of the first upstream stage responsive to a third control signal having a timing with respect to the second control signal that varies responsive to a frequency at which data is transferred along the data path, e.g., a time interval between assertion of the third control signal and assertion of the second control signal may decrease responsive to an increase in the frequency at which the data is transferred along the data path. In some embodiments of the present invention, the control circuit includes a fixed delay circuit that generates the first control signal from the second control signal. For example, the fixed delay circuit may include a fixed delay circuit in a forward path of a delay locked loop (DLL) or a phase locked loop (PLL).

In additional embodiments of the present invention, the control circuit is further operative to selectively fix timing of the second control signal to one of timing of the first control signal and timing of the third control signal. For example, the control circuit may include a first fixed delay circuit operative to generate the first control signal from the second control signal and a second fixed delay circuit operative to generate the second control signal from the third control signal. The control circuit may be operative to allow relative timing of the third control signal with respect to the second control signal to vary with the frequency at which the data is transferred along the data path when timing of the second control signal is fixed to timing of the first control signal.

In still further embodiments of the present invention, the data path includes a third upstream stage that sends data to the second upstream stage responsive to a fourth control signal, and the control circuit is further operative to fix timing of the fourth control circuit to timing of the third control signal. The control circuit may include a fixed delay circuit operative to generate the third control signal from the fourth control signal. The data path may include a fourth upstream stage that sends data to an input of the third upstream stage responsive to a fifth control signal, and the control circuit may be further operative to selectively fix timing of the fourth control signal to one of timing of the fourth control signal or timing of the fifth control signal. The control circuit may also be operative to fix timing of the second control signal to one of timing of the first control signal or timing of the third control signal.

In some embodiments of the present invention, an integrated circuit memory device includes a clocked output buffer that latches data responsive to a clock signal and a sense amplifier that passes data at an input thereof to an input of the clocked output buffer responsive to an enable signal. The device further includes a control circuit operative to fix timing of the enable signal to timing of the clock signal. The sense amplifier may include a first sense amplifier and the enable signal may include a first enable signal, and the device may further include a second sense amplifier that sends the data to an input of the first sense amplifier responsive to a second enable signal having a timing with respect to the first enable signal that varies responsive to a rate at which the data is transferred through the first and second sense amplifiers. The control circuit may include a fixed delay circuit that generates the clock signal from the first enable signal. For example, the fixed delay circuit may include a fixed delay circuit in a forward path of a DLL circuit or a PLL circuit.

In some method embodiments of the present invention, a data path is operated by strobing data at an input of a downstream stage of the data path responsive to a first control signal, sending data to the input of the downstream stage responsive to a second control signal, and fixing timing of the second control signal to timing of the first control signal. For example, the upstream stage may include a first upstream stage, and the method may further include sending data from a second upstream stage to an input of the first upstream stage responsive to a third control signal such that timing of the third control signal with respect to the second control signal varies responsive to a frequency at which data is transferred along the data path. Timing of the second control signal may be fixed to timing of the first control signal while transferring data through the data path at rate greater than a predetermined threshold rate, and timing of the second control signal may be fixed to timing of the third control signal while transferring data through the data path a rate less than the predetermined threshold rate.

According to additional aspects of the present invention, a method is provided for characterizing a data path including a first driver-receiver pair including a first driver circuit and a first receiver circuit and a second driver-receiver pair including a second driver circuit and a second receiver circuit. Timing of an enable signal for the first driver circuit is fixed to timing of an enable signal for the first receiver circuit and timing of an enable signal for the second receiver circuit is fixed to timing of a data strobe signal for a stage downstream of the second receiver circuit while increasing a rate at which data is passed through the data path to determine a minimum delay between the second driver circuit and the first driver circuit. Timing of the enable signal for the first receiver circuit is fixed to timing of an enable signal for the second driver circuit and timing of the enable signal for the second driver circuit is fixed to timing of the enable signal for the second receiver circuit while increasing a rate at which data is passed through the data path to determine a minimum delay between the first driver circuit and the first receiver circuit.

DETAILED DESCRIPTION OF EMBODIMENTS

Figure 1:
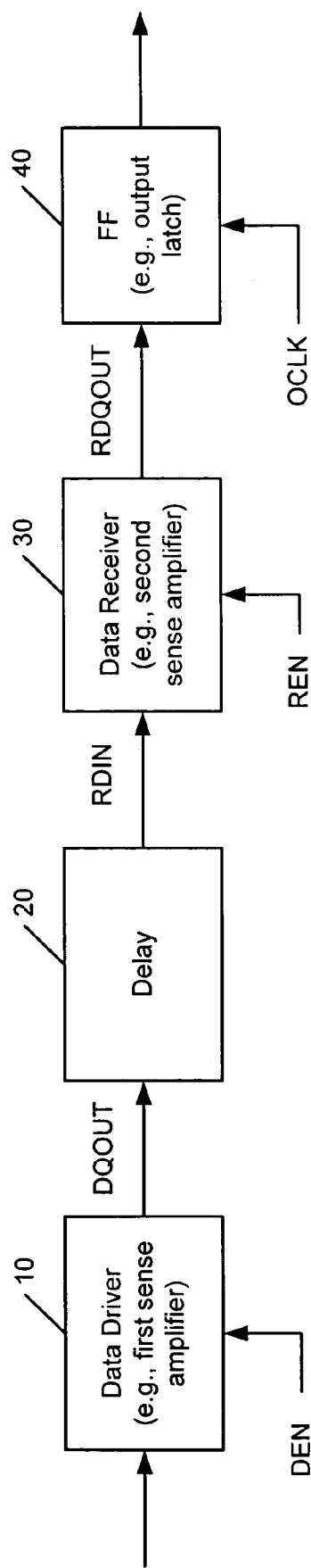
FIG. 1 is a schematic diagram of a conventional integrated circuit data path.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

Figure 3:
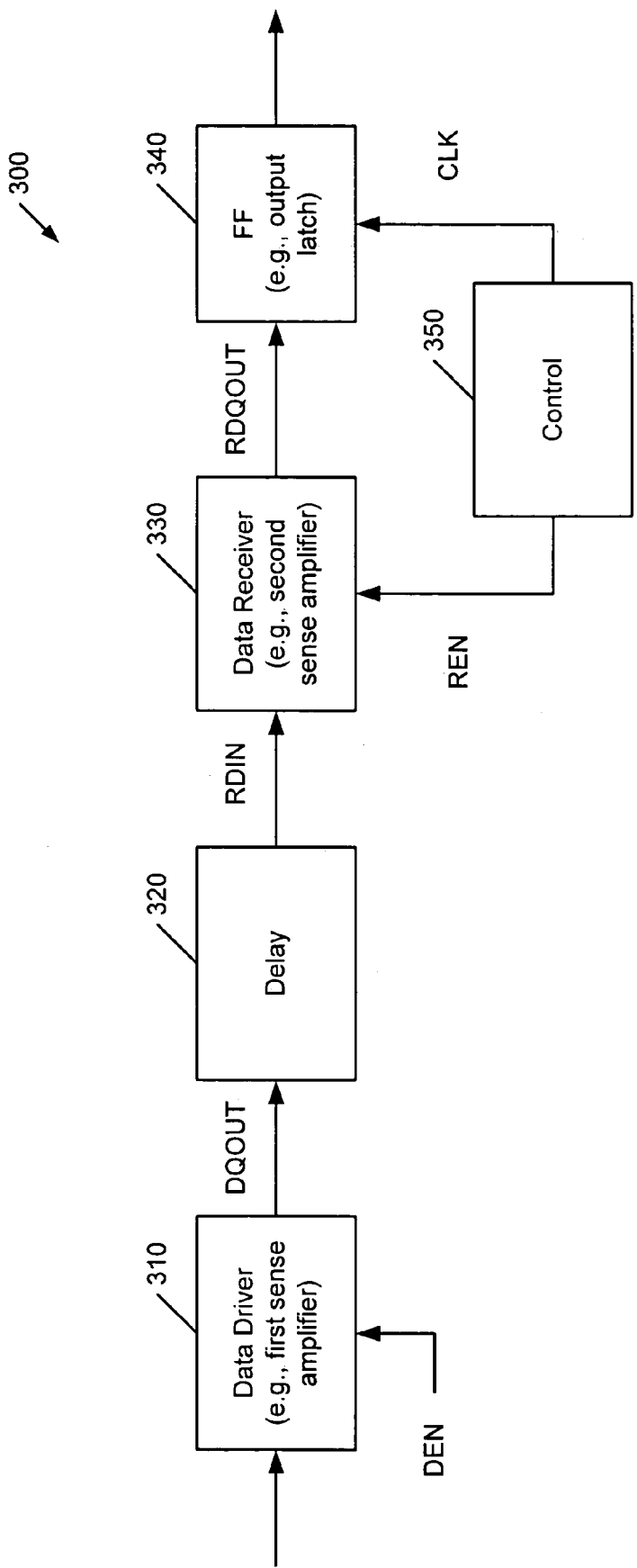
FIG. 3 is a schematic diagram illustrating a data path according to some embodiments of the present invention.

FIG. 3 illustrates a data path 300 according to some embodiments of the present invention. The data path 300 includes a first upstream stage in the form of a data receiver 330 that receives data at a data input RDIN after the data has passed through a delay 320, e.g., wiring, additional buffers, etc., from a second upstream stage, here a data driver 310, that produces the data at a data output DQOUT responsive to a driver enable signal DEN. The data receiver 330 receives and passes the data on to a downstream stage, here shown as a flip-flop (FF) 340, responsive to a receiver enable signal REN. It will be appreciated that in other embodiments, the downstream stage may comprise some other type of strobed data stage, such as another level-enabled sense-amplifier.

According to some embodiments of the present invention, a control circuit 350 fixes timing of the receiver enable signal REN to timing of a clock signal CLK that strobes data into the FF 340, while allowing timing of the receiver enable signal REN to vary with respect to the driver enable signal DEN as the rate at which data passes through the data path 300 varies. It will be appreciated that, according to some embodiments of the present invention, such as embodiments in high-speed memory devices, the data path 300 may comprise a portion of data output path for data stored in the memory device, e.g., the data driver 310 and the data receiver may comprise respective sense amplifiers and the FF 340 may comprise an output latch. However, it will be appreciated that the present invention is applicable to other types of data paths.

Figure 4:
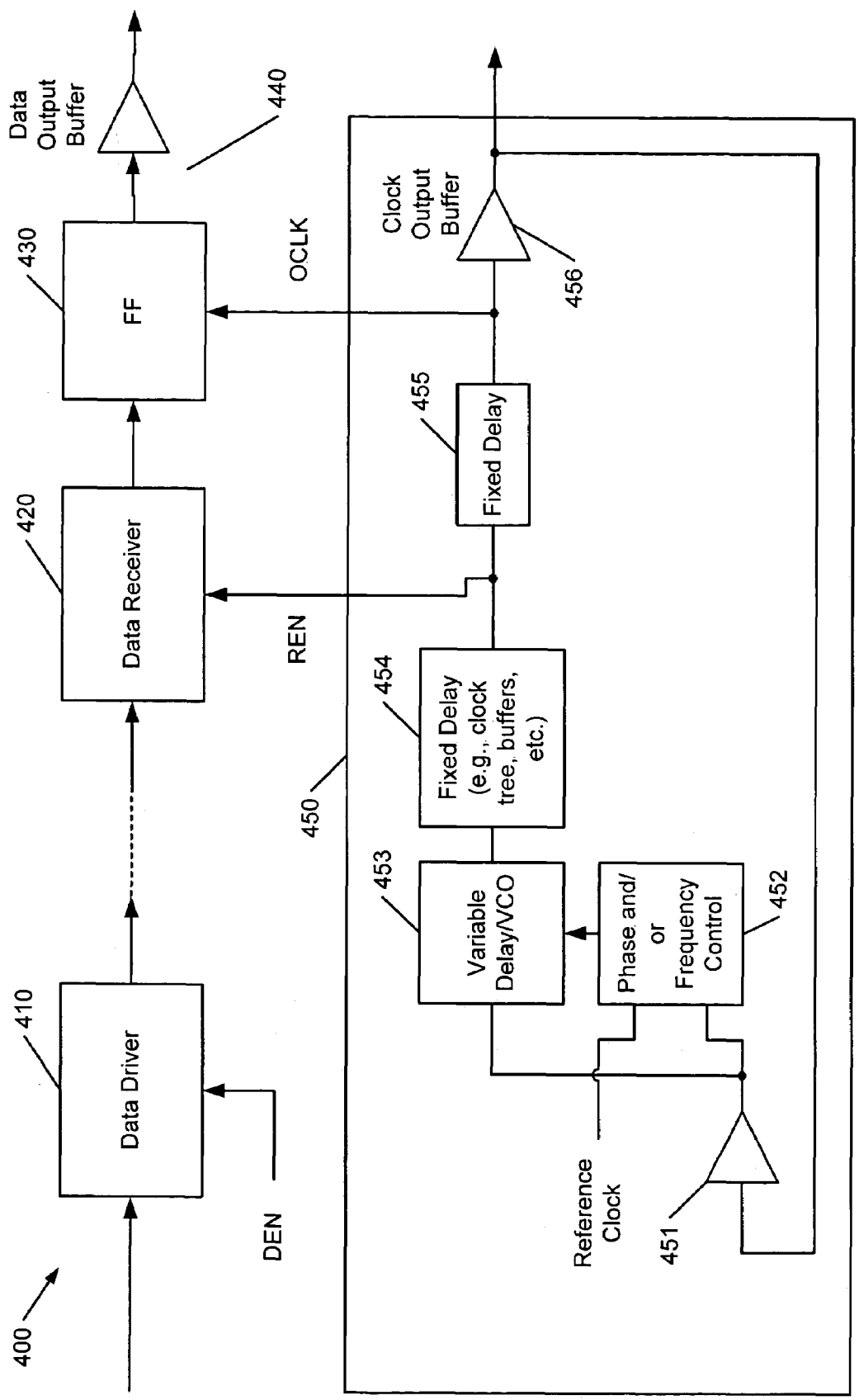
FIG. 4 is a schematic diagram illustrating a data path according to further embodiments of the present invention.

FIG. 4 illustrates a data path 400 of an integrated circuit device according to further embodiments of the present invention. The data path 400 includes a data driver 410 (e.g., a level-enabled sense amplifier) that produces data responsive to a driver enable signal DEN. Data produced by the data driver 410 is received and passed on by a data receiver (e.g., a second sense amplifier) responsive to a receiver enable signal REN. The data transmitted by the data receiver 420 is received and latched by a FF 430 (e.g., an output data latch) responsive to an output clock signal OCLK. The FF 440 transmits the latched data off-chip via an output buffer 440.

Timing of the receiver enable signal REN is fixed to timing of the output clock signal OCLK by generating these signals in a forward path of a clock generator circuit 450, such as a delay locked loop (DLL) or a phase locked loop (PLL). In particular, the output clock signal OCLK may be generated from the receiver enable signal REN by a fixed delay circuit 455. As shown, the fixed delay circuit 455 receives a clock signal from a variable frequency/delay element 453, such as a variable delay circuit (e.g., in the case of a DLL) or a voltage controlled oscillator (VCO) (e.g., in the case of a PLL), that is controlled by a phase and/or frequency detector 452. The variable frequency/delay element 453 may be separated from the fixed delay circuit 457 by fixed delay circuitry 454, such as a clock tree, buffer, etc. The output clock signal OCLK may be transmitted off chip by a clock output buffer 456, the output of which is fed back to the phase and/or frequency detector 452 via an input buffer 451.

Figure 2:
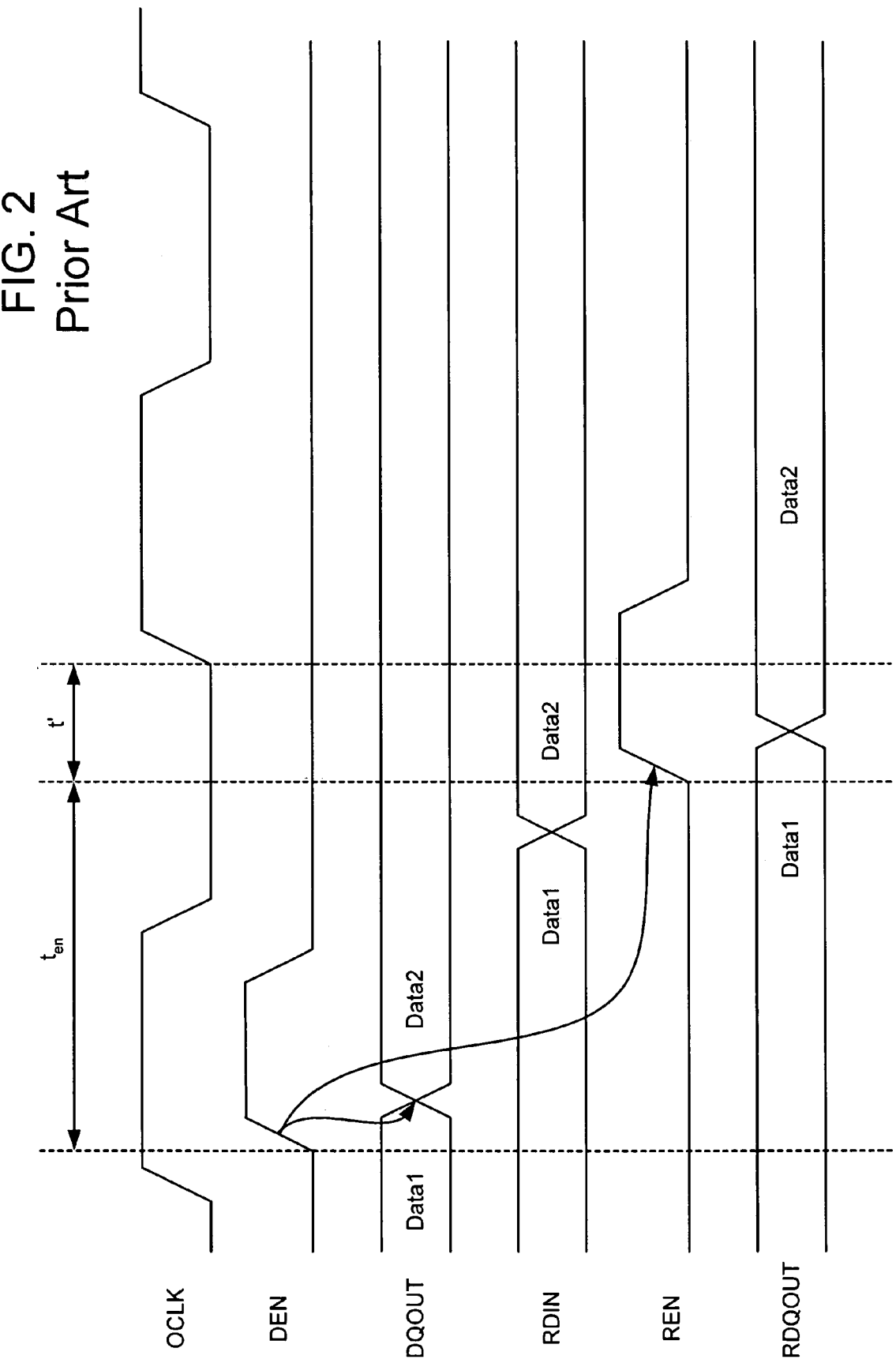
FIG. 2 is a timing diagram illustrating conventional operations of the integrated circuit data path of FIG. 1.
Figure 5:
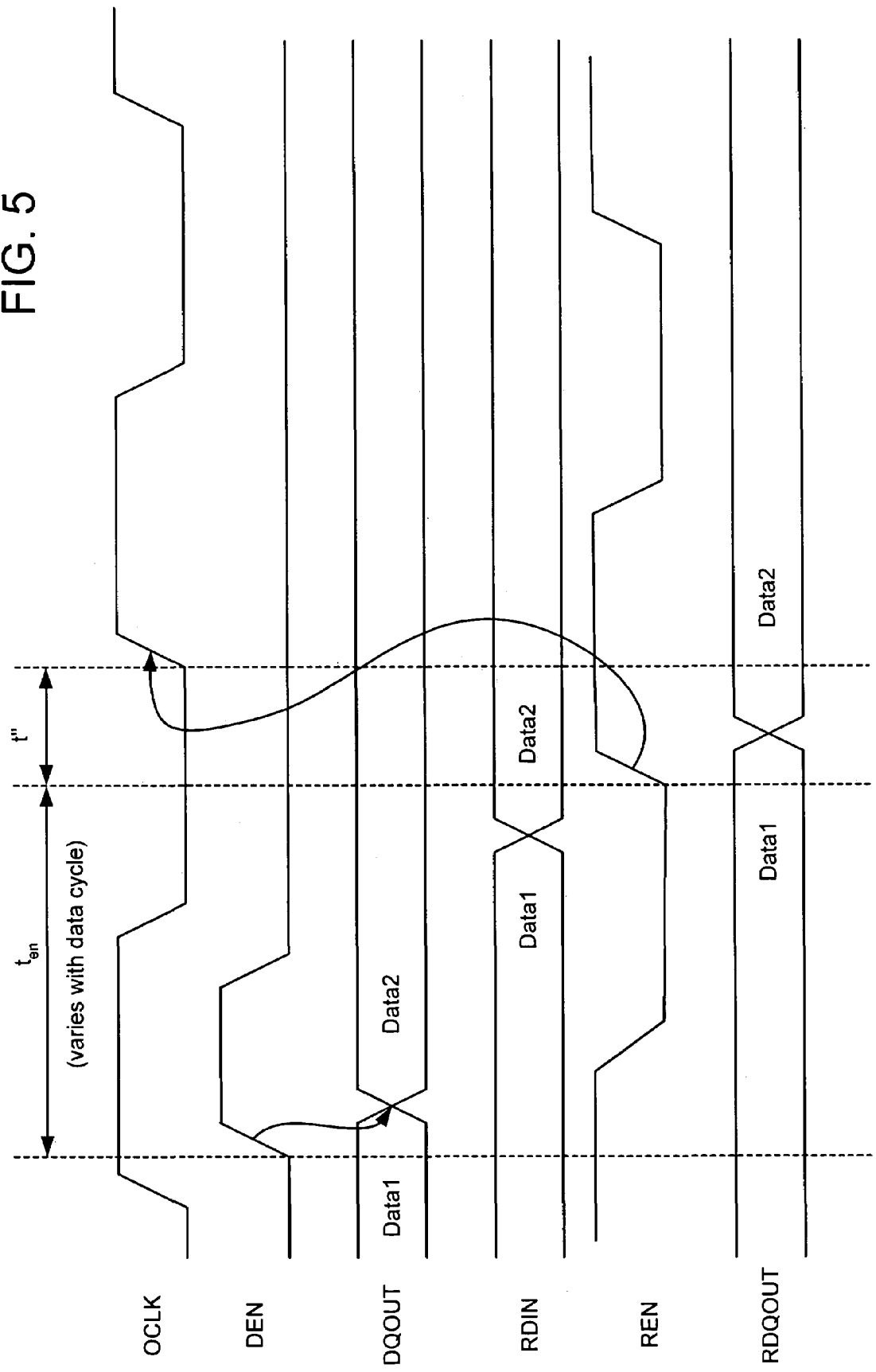
FIG. 5 is a timing diagram illustrating exemplary operations of the data path of FIG. 4 according to some embodiments of the present invention.

FIG. 5 illustrates exemplary operations of the data path 400 of FIG. 4. In particular, in contrast to the conventional data path operation shown in FIG. 2, the fixed delay circuit 455 provides a substantially fixed (e.g., except for minor variations due to temperature variation, process variation or power supply voltage variation) time interval t" between assertion of the receiver enable signal REN and the next rising edge of the output clock signal OCLK, while allowing the time ten between the driver enable signal DEN and the receiver enable signal REN to vary with the data cycle time for the data path 400.

Embodiments of the present invention can allow a designer to minimize cycle time of a data path, such as an output data path in a high-speed memory device. For example, referring the exemplary circuit of FIG. 4, timing of the receiver enable signal REN can be based on the output clock signal OCLK, and not the timing of the driver enable signal DEN, so that setup time requirements of the FF 430 can be guaranteed. In many applications, such setup time usually is small compared to the time required for propagation of data between the data driver 410 and the data receiver 430 and, therefore, may be set (e.g., over a population of devices and/or a range of operating conditions) with less impact on overall data path performance.

If the delay between the receiver enable signal REN and the output clock signal OCLK is fixed as data path cycle time is reduced, a minimum cycle time of the data path 400 may be determined by detecting (e.g., in a test procedure) the point at which valid data is not longer output from the data path 400. This may be used to determine a maximum data rate at which the data path 400 may be operated with the delay $t_{en}$ between the driver enable signal and the receiver enable signal being allowed to vary with cycle time. Such a test may also be used to determine a minimum time to which the delay $t_{en}$ between the driver enable signal DEN and the receiver enable signal REN may be fixed (e.g., in a trimming or calibration procedure) to guarantee valid operation within a range of data path cycle times.

Figure 6:
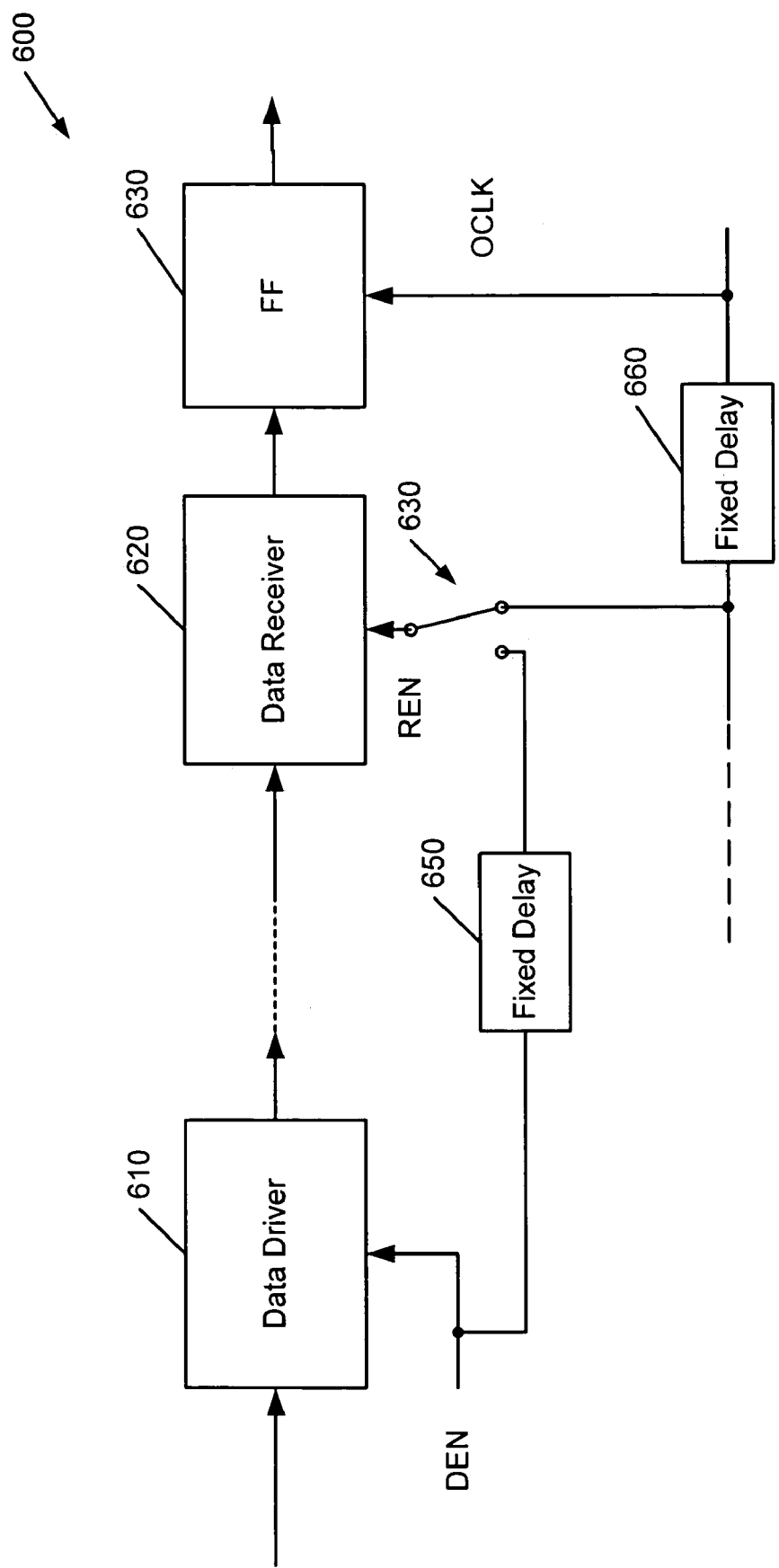
FIG. 6 is a schematic diagram illustrating a reconfigurable data path according to further embodiments of the present invention.

If the time delay between the driver enable signal DEN and the receiver enable signal REN cannot be allowed to increase with cycle time beyond a certain amount, then, according to further embodiments of the present invention, circuitry may be provided to allow a first mode of operation in which the receiver enable signal REN is fixed to the output clock signal OCLK and a second mode of operation in which the receiver enable signal REN is fixed to the driver enable signal DEN. For example, as shown FIG. 6, a data path 600 may include a switch 630 that is operative in a first mode to fix a receiver enable signal REN applied to a data receiver 620 to a driver enable signal DEN via a first fixed delay circuit 650. Such a mode might be used, for example, when cycle time of the data path 600 is relatively large. In a second mode, e.g., when cycle time of the data path is relatively small, the switch 630 is operative to fix the receiver enable signal REN to a clock signal OCLK applied to a FF 630 using a second fixed delay circuit 660. It will be appreciated that, in the second mode, the receiver enable signal REN may be produced by a circuit such as a PLL or DLL as described above with reference to FIG. 4.

In further embodiments of the present invention, similar fixing of upstream data path stage timing to downstream data path stage timing can be used in data paths having multiple driver-receiver pairs. In such systems, non-idealities in driver-receiver pair delays can accumulate, and thus can have an even greater impact on data path cycle time. According to some embodiments of the present invention illustrated in FIGS. 7A and 7B, a data path 700 includes a first driver-receiver pair including a first data driver 710 that operates responsive to a first driver enable signal DEN 1 and a first data receiver 720 that operates responsive to a first receiver enable signal REN 1. A second driver receiver pair includes a second data driver 730 that operate responsive to a driver enable signal DEN2 and a second data receiver 740 that operates responsive to a second receiver enable signal REN2. The second data receiver 740 transmits data to a FF 750 that operates responsive to a clock signal CLK.

Figure 7A:
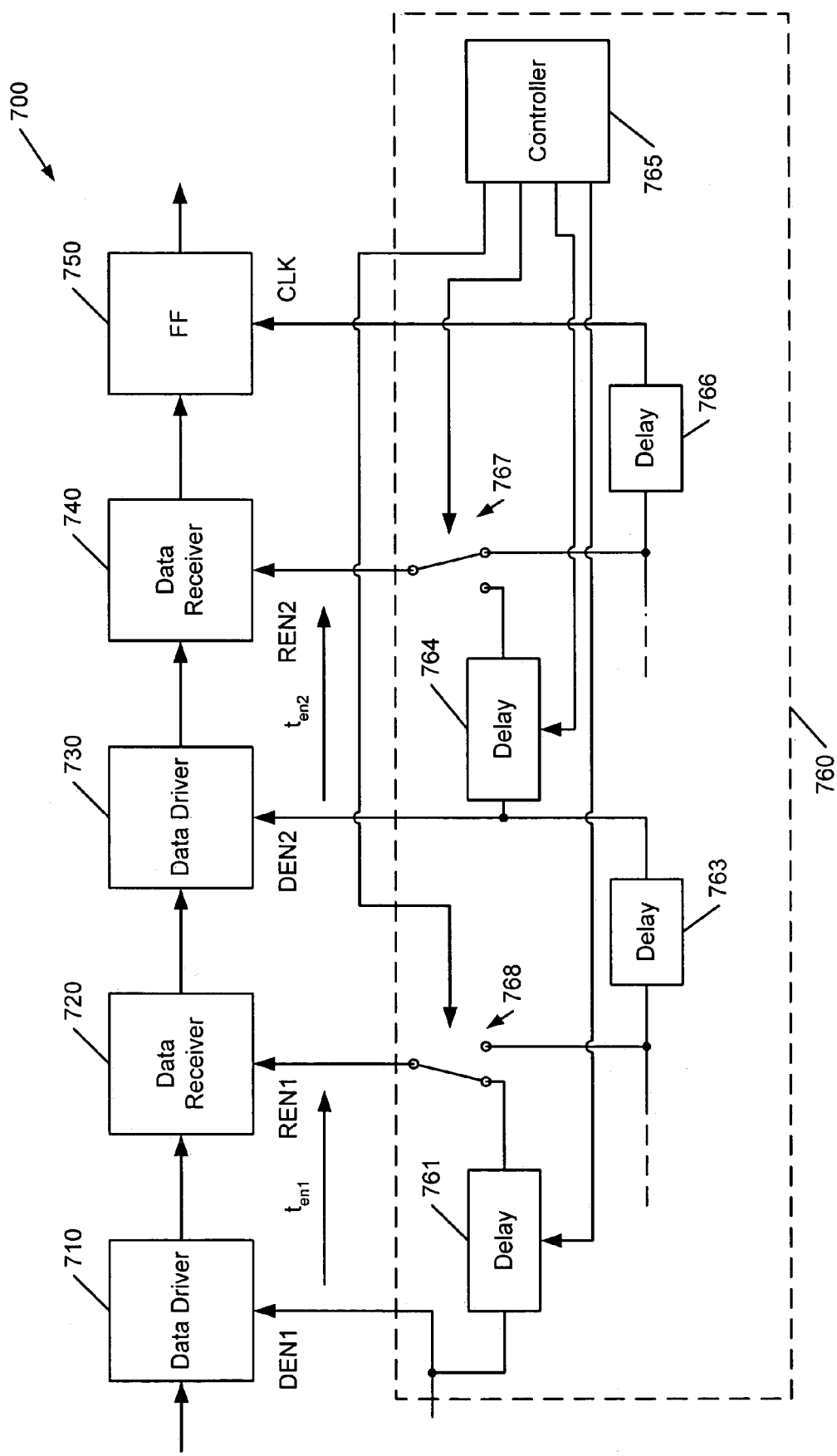
FIGS. 7a and 7b are schematic diagrams illustrating a reconfigurable data path and exemplary operations thereof according to additional embodiments of the present invention.
Figure 7B:
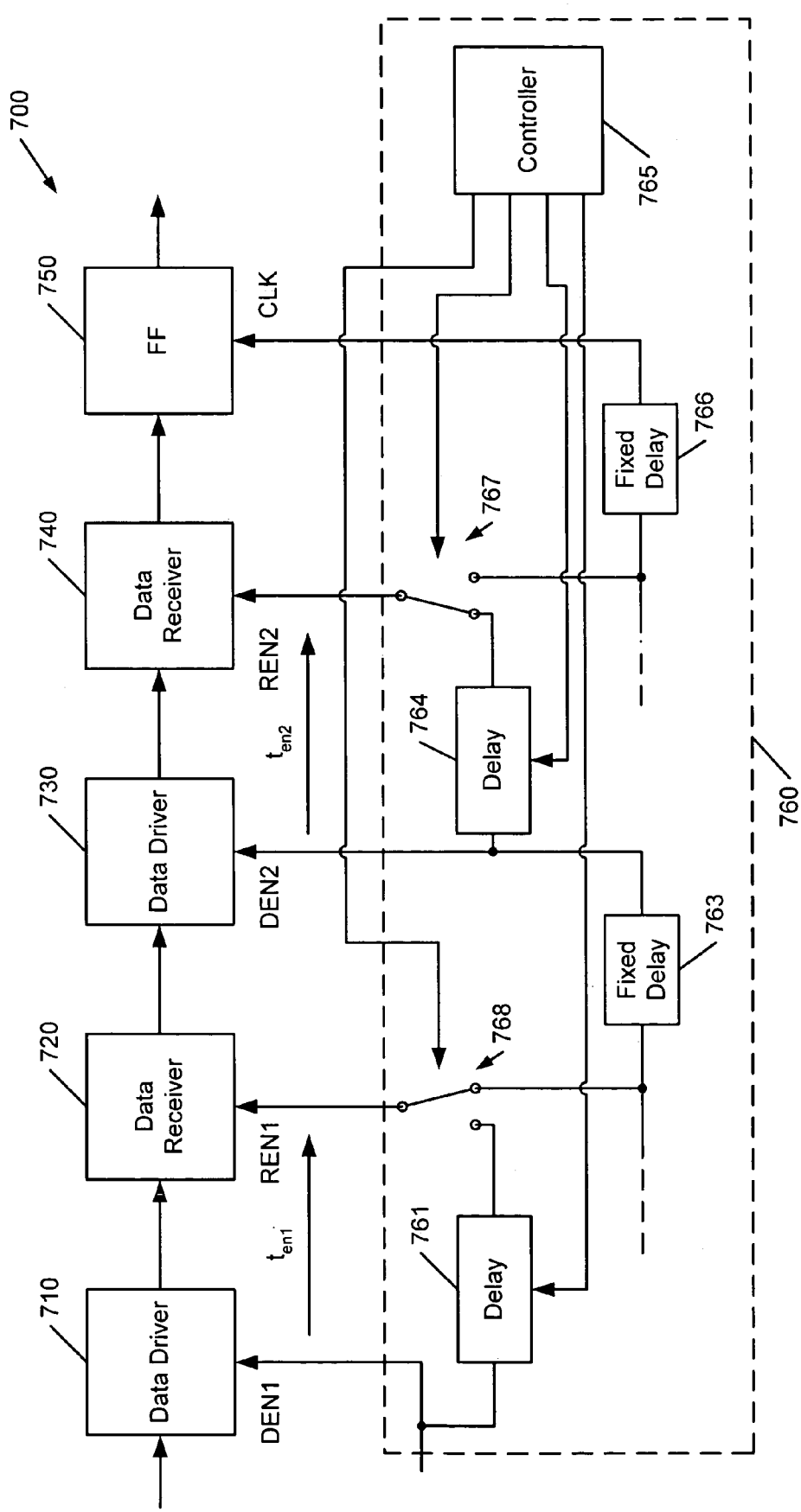

The data path 700 further includes a control circuit 760 that includes a first switch 768 that is operative to tie timing of the first receiver enable signal REN1 to timing of the first driver enable signal DEN 1 in a first mode using a delay circuit 761(FIG. 7A), and to tie timing of the first receiver enable signal REN1 to the second driver enable signal DEN2 in a second mode using a delay circuit 763 (FIG. 7B). The control circuit 760 further includes a second switch 767 that ties timing of the second receiver enable signal REN 2 to the clock signal CLK in a first mode using a delay circuit 764(FIG. 7A) and that ties timing of the second receiver enable signal to the second driver enable signal DEN2 in a second mode using a delay circuit 766 (FIG. 7B). The control circuit 760 further includes a controller 765 that controls the switches 767, 768 and the delay circuits 763, 766.

In particular, in system characterization operations illustrated in FIGS. 7A and 7B, first and second delays $t_{en1}$ (between the first receiver enable signal REN1 and the first driver enable signal DEN1) and $t_{en2}$ (between the second receiver enable signal REN2 and the second driver enable signal DEN2) can be minimized in a sequential manner. As shown in FIG. 7A, the first delay $t_{en1}$ is fixed (the first receiver enable signal REN1 fixed to the first driver enable signal DEN 1) using the delay circuit 761 to a minimum value determined, for example, by a system simulation. The second delay $t_{en2}$ is allowed to vary by fixing the second receiver enable signal REN2 to the clock signal CLK using the delay circuit 766. The data cycle time is then decreased to the point that valid data no longer is produced at the FF 750, which allows a determination of a minimum value for the second delay $t_{en2}$. Referring to FIG. 7B, the delay circuit 764 may then be used to provide this minimum value for $t_{en2}$, and the first receiver enable signal REN1 is fixed to the second driver enable signal DEN2 using the first fixed delay circuit 763, which will allow the first delay $t_{en1}$ to vary with the data path cycle time. The data path cycle time may be decreased until valid data no longer is produced at the FF 750, which allows determination of a minimum value for the first delay $t_{en1}$.

Similar to the operations described above with reference to FIG. 4, these operations may be used to determine a maximum data rate at which the data path 400 may be operated with either or both of the delays $t_{en1}$ $t_{en2}$ being allowed to vary with cycle time. Such a characterization procedure may also be used to determine a values at which to fix the delays $t_{en1}$, $t_{en2}$ to guarantee valid operation within a range of data path cycle times. It will be appreciated that these and other characterization/calibration procedures within the scope of the present invention may be particularly advantageous in producing integrated circuit devices, such as high-speed memory devices. In particular, control circuitry along the lines described above may be included in such devices for use in calibrating the devices at various points in a manufacturing process (e.g., after dicing and/or packaging).

In the drawings and specification, there have been disclosed exemplary embodiments of the invention. Although That which is claimed is:

1. A data path, comprising:
   a downstream stage that strobes data at an input thereof responsive to a first control signal;
   a first upstream stage that sends data to the input of the downstream stage responsive to a second control signal;
   a second upstream stage that sends data to an input of the first upstream stage responsive to a third control signal having a timing with respect to the second control signal that varies responsive to a frequency at which data is transferred along the data path; and
   a control circuit operative to selectively fix timing of the second control signal to one of timing of the first control signal and timing of the third control signal.

2. A data path according to claim 1, wherein a time interval between assertion of the third control signal and assertion of the second control signal decreases responsive to an increase in the frequency at which the data is transferred along the data path.

3. A data path according to claim 1, wherein the control circuit comprises a fixed delay circuit that generates the first control signal from the second control signal.

4. A data path according to claim 3, wherein the fixed delay circuit comprises a fixed delay circuit in a forward path of a delay locked loop (DLL) or a phase locked loop (PLL).

5. A data path according to claim 1, wherein the control circuit comprises a first fixed delay circuit operative to generate the first control signal from the second control signal and a second fixed delay circuit operative to generate the second control signal from the third control signal.

6. A data path according to claim 1, wherein the control circuit is operative to allow relative timing of the third control signal with respect to the second control signal to vary with the frequency at which the data is transferred along the data path when timing of the second control signal is fixed to timing of the first control signal.

7. A data path according to claim 1:
   wherein the data path comprises a third upstream stage that sends data to the second upstream stage responsive to a fourth control signal; and
   wherein the control circuit is further operative to fix timing of the fourth control circuit to timing of the third control signal.

8. A data path according to claim 7, wherein the control circuit comprises a fixed delay circuit operative to generate the third control signal from the fourth control signal.

9. A data path according to claim 7:
   wherein the data path comprises a fourth upstream stage that sends data to an input of the third upstream stage responsive to a fifth control signal; and
   wherein the control circuit is further operative to selectively fix timing of the fourth control signal to one of timing of the third control signal and timing of the fifth control signal.

10. A data path according to claim 1, wherein the first upstream stage comprises a level-enabled data receiver circuit.

11. A data path according to claim 10, wherein the level-enabled data receiver circuit comprises a sense amplifier circuit.

12. A data path according to claim 11, wherein the downstream stage comprises a flip-flop circuit.

13. An integrated circuit memory device, comprising:
    a clocked output buffer that latches data responsive to a clock signal;
    a first sense amplifier that passes data at an input thereof to an input of the clocked output buffer responsive to a first enable signal;
    a second sense amplifier that sends the data to an input of the first sense amplifier responsive to a second enable signal having a timing with respect to the first enable signal that varies responsive to a rate at which the data is transferred through the first and second sense amplifiers; and
    a control circuit operative to selectively fix timing of the first enable signal to one of timing of the clock signal and timing of the second enable signal.

14. A device according to claim 13, wherein the control circuit comprises a fixed delay circuit that generates the clock signal from the first enable signal.

15. A device according to claim 14, wherein the fixed delay circuit comprises a fixed delay circuit in a forward path of a DLL circuit or a PLL circuit.

16. A device according to claim 13, wherein the control circuit comprises a first fixed delay circuit operative to generate the clock signal from the first enable signal and a second fixed delay circuit operative to generate the first enable signal from the second enable signal.

17. A device according to claim 13, wherein the control circuit is operative to allow relative timing of the second enable signal with respect to the first enable signal to vary with the frequency at which the data is transferred through the first and second sense amplifiers when timing of the first enable signal is fixed to timing of the clock signal.

18. A device according to claim 13, further comprising a third sense amplifier that sends data to the second sense amplifier responsive to a third enable signal, and wherein the control circuit is further operative to fix timing of the third enable signal to timing of the second enable signal.

19. A device according to claim 18, wherein the control circuit comprises a fixed delay circuit operative to generate the second enable signal from the third enable signal.

20. A device according to claim 18, further comprising a fourth sense amplifier that sends data to an input of the third sense amplifier responsive to a fourth enable signal; and
    wherein the control circuit is further operative to selectively fix timing of the third enable signal to one of timing of the second enable signal and timing of the fourth enable signal.

21. A method of operating a data path, the method comprising:
    strobing data at an input of a downstream stage of the data path responsive to a first control signal;
    sending data to the input of the downstream stage from a first upstream stage responsive to a second control signal;
    sending data from a second upstream stage to an input of the first upstream stage responsive to a third control signal such that timing of the third control signal with respect to the second control signal varies responsive to a frequency at which data is transferred along the data path; and
    selectively fixing timing of the second control signal to one of timing of the first control signal and timing of the third control signal.

22. A method according to claim 21, wherein the first and second upstream stages comprise respective first and second sense amplifiers.

23. A method according to claim 22, wherein the downstream stage comprises a flip-flop.

24. A method according to claim 21, wherein selectively fixing timing of the second control signal to one of timing of the first control signal and timing of the third control signal comprises fixing timing of the second control signal to timing of the first control signal while transferring data through the data path at rate greater than a predetermined threshold rate, and further comprising fixing timing of the second control signal to timing of the third control signal while transferring data through the data path a rate less than the predetermined threshold rate.

25. A method of characterizing a data path comprising a first driver-receiver pair including a first driver circuit and a first receiver circuit and a second driver-receiver pair comprising a second driver circuit and a second receiver circuit, the method comprising:
  fixing timing of an enable signal for the first driver circuit to timing of an enable signal for the first receiver circuit and fixing timing of an enable signal for the second receiver circuit to timing of a data strobe signal for a stage downstream of the second receiver circuit while increasing a rate at which data is passed through the data path to determine a minimum delay between the second driver circuit and the second receiver circuit; and
  fixing timing of the enable signal for the first receiver circuit to timing of an enable signal for the second driver circuit and fixing timing of the enable signal for the second driver circuit to timing of the enable signal for the second receiver circuit while increasing a rate at which data is passed through the data path to determine a minimum delay between the first driver circuit and the first receiver circuit.

26. A method according to claim 25, wherein fixing timing of the enable signal for the first receiver circuit to timing of an enable signal for the second driver circuit and fixing timing of the enable signal for the second driver circuit to timing of the enable signal for the second receiver circuit while increasing a rate at which data is passed through the data path to determine a minimum delay between the first driver circuit and the first receiver circuit comprises fixing timing of the enable signal for the first receiver circuit to timing of an enable signal for the second driver circuit, fixing timing of the enable signal for the second driver circuit to timing of the enable signal for the second receiver circuit and fixing timing of the enable signal for the second receiver circuit to timing of a data strobe signal for a stage downstream of the second receiver circuit while increasing a rate at which data is passed through the data path to determine the minimum delay between the first driver circuit and the first receiver circuit.

27. A method according to claim 25:
  wherein fixing timing of an enable signal for the first driver circuit to timing of an enable signal for the first receiver circuit comprises providing a fixed delay between the enable signal for the first driver circuit and the enable signal for the first receiver circuit;
  wherein fixing timing of an enable signal for the second receiver circuit to timing of a data strobe signal for a stage downstream of the second receiver circuit comprises providing a fixed delay between the enable signal for the second receiver circuit and the data strobe signal for the downstream stage;
  wherein fixing timing of the enable signal for the first receiver circuit to timing of an enable signal for the second driver circuit comprises providing a fixed delay between the enable signal for the first receiver circuit and the enable signal for the second driver circuit; and
  wherein fixing timing of the enable signal for the second driver circuit to timing of the enable signal for the second receiver circuit comprises providing a fixed delay between the enable signal for the second driver circuit and the enable signal for the second receiver circuit.

28. A method according to claim 27, wherein the downstream stage comprises a flip-flop.

29. A method according to claim 25, wherein the first and second driver circuits and the first and second receiver circuits comprise respective sense amplifiers.

* * * * *